J. CALLANAN.
Insect Killing Liquid.
No. 240,382. Patented April 19, 1881.
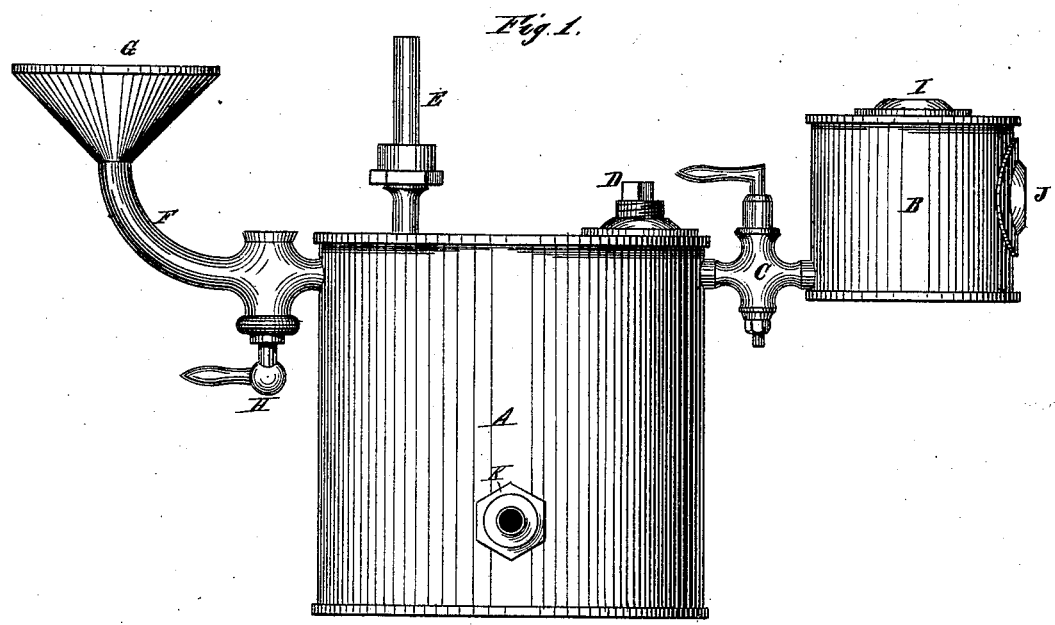
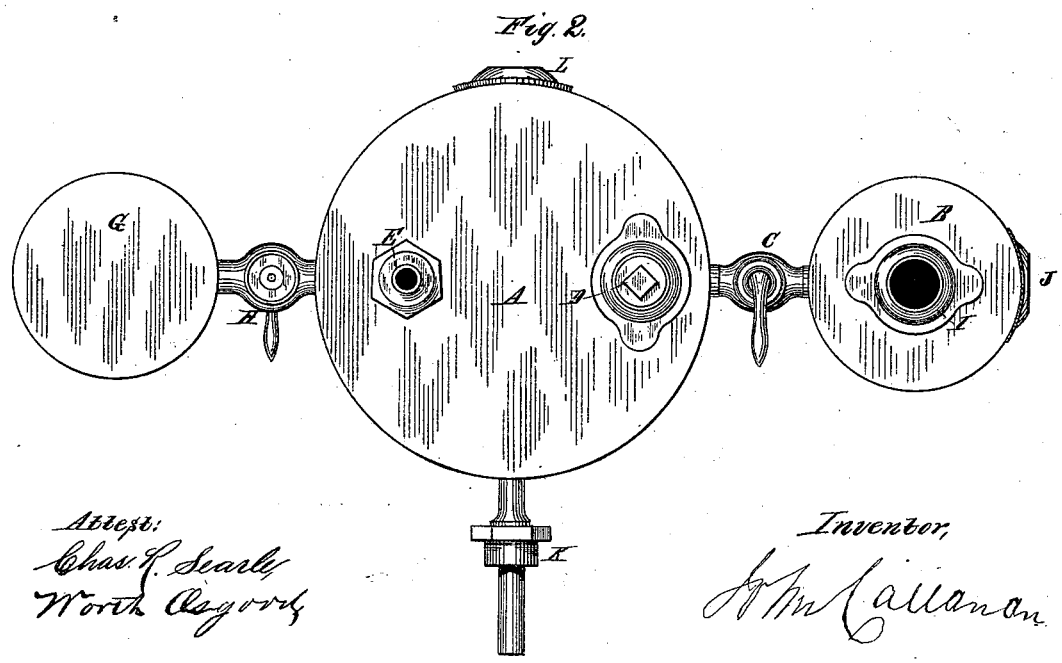

UNITED STATES PATENT OFFICE.

JOHN CALLANAN, OF BROOKLYN, NEW YORK.

INSECT-KILLING LIQUID.

SPECIFICATION forming part of Letters Patent No. 240,382, dated April 19, 1881.

Application filed April 28, 1879.

*To all whom it may concern:*

Be it known that I, JOHN CALLANAN, of Brooklyn, in the county of Kings and State of New York, have invented a new and useful Compound Liquid for Destroying Insect Life and Dissolving Snow and Ice, and for other purposes, of which the following is a full, clear, and exact description.

The drawings herewith illustrate a convenient form of apparatus in which my improved liquid may be compounded.

Figure 1 is a side elevation, and Fig. 2 a plan view.

Like letters in both figures indicate corresponding parts.

A is a tank of large dimensions, capable of withstanding a considerable pressure. B is a cistern, connected therewith by a valve-union; and G is a hopper, likewise connected with the tank by a valve-union.

The tank is provided with a suitable door or trap, D, for the introduction of some of the materials, with a coupling, E, intended to unite the interior of the tank with the machinery or other apparatus in which the generated steam and gases are to be employed, with a blow-off, L, or aperture through which the sediment in the tank may be withdrawn, and with a suitable union for withdrawing the compound when desired to be used in the liquid form.

With an apparatus of substantially the above-described construction and arrangement of parts in order to produce my improved compound I proceed as follows: I place six hundred pounds of well-burned lime in the cistern B and let in upon it five thousand gallons of water, the cock C being closed. In the tank A, I put one thousand pounds of well-burned lime and one hundred pounds of potash, close up all the apertures to the tank, and mix in the hopper G twenty-five gallons of crude rock-oil and eight hundred and ten pounds of sulphuric acid. By the slaking of the lime in the cistern B the water therein has become heated. I now open cock C and allow the contents of cistern B to flow into the tank, and at the same time open cock F and allow two-thirds of the mixture in the hopper G likewise to flow into the tank. Close cocks C and F and the chemical action of the materials in the tank will produce a liquid that will destroy all insect life and dissolve snow and ice. When the pressure in the tank becomes diminished the remainder of the mixture in the hopper is to be let run into the tank to strengthen the poisonous properties of the liquid.

Having thus fully described my invention, what I claim as new, and desire to secure by Letters Patent, is—

The herein-described compound, consisting of water, lime, potash, crude rock-oil, and sulphuric acid, all united substantially in the manner and in the proportions specified, for the purposes and objects named.

JOHN CALLANAN.

Witnesses:
  LAURENCE JOHN CALLANAN,
  WILLIAM FRANCIS WALL.